United States Patent
Akazaki et al.

(10) Patent No.: US 9,429,091 B2
(45) Date of Patent: Aug. 30, 2016

(54) FUEL INJECTION APPARATUS FOR INTERNAL COMBUSTION ENGINE

(71) Applicants: HONDA MOTOR CO., LTD., Tokyo (JP); KEIHIN CORPORATION, Tokyo (JP)

(72) Inventors: Shusuke Akazaki, Wako (JP); Shunichi Saito, Tochigi-ken (JP); Kaoru Akiyama, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/672,678

(22) Filed: Mar. 30, 2015

(65) Prior Publication Data
US 2015/0292458 A1  Oct. 15, 2015

(30) Foreign Application Priority Data
Apr. 10, 2014 (JP) .................. 2014-080629

(51) Int. Cl.
| | |
|---|---|
| F02D 41/00 | (2006.01) |
| F02D 41/20 | (2006.01) |
| F02D 35/02 | (2006.01) |
| G01L 23/10 | (2006.01) |
| F02D 41/38 | (2006.01) |
| F02D 41/14 | (2006.01) |

(52) U.S. Cl.
CPC ............. *F02D 41/20* (2013.01); *F02D 35/023* (2013.01); *G01L 23/10* (2013.01); *F02D 2041/1432* (2013.01); *F02D 2041/2048* (2013.01); *F02D 2041/2058* (2013.01); *F02D 2041/389* (2013.01)

(58) Field of Classification Search
CPC ........... F02D 41/20; F02D 2041/2048; F02D 2041/2058; F02D 2041/1432; F02D 2041/2075; F02D 2041/389; F02D 2041/2079; F02D 35/023; G01L 23/10
See application file for complete search history.

(56) References Cited

U.S. PATENT DOCUMENTS

| | | | | |
|---|---|---|---|---|
| 9,200,585 B2* | 12/2015 | Akazaki | ............... | F02D 41/3005 |
| 2008/0184968 A1* | 8/2008 | Matsuura | ................ | F02D 41/20 123/490 |
| 2013/0036803 A1* | 2/2013 | Itou | ......................... | G01L 23/10 73/114.18 |

FOREIGN PATENT DOCUMENTS

JP  2014-001700 A  1/2014

*Primary Examiner* — Hieu T Vo
*Assistant Examiner* — Sherman Manley
(74) *Attorney, Agent, or Firm* — Squire Patton Boggs (US) LLP (57) ABSTRACT

A fuel injection apparatus for an internal combustion engine having a plurality of cylinders is provided. The fuel injection apparatus includes a fuel injection valve and an in-cylinder pressure sensor disposed for each of the plurality of cylinders. The fuel injection valve injects fuel into a combustion chamber of each cylinder and the in-cylinder pressure sensor detects a pressure in the combustion chamber. The fuel injection apparatus includes a cylinder pair actuating circuit and a noise suppressing circuit. The cylinder pair actuating circuit is provided corresponding to a cylinder pair which is a combination of two cylinders included in the plurality of cylinders, for supplying actuating current to two actuating solenoids of the two fuel injection valves mounted on the cylinder pair. The noise suppressing circuit is provided between the cylinder pair actuating circuit and the actuating solenoids. The noise suppressing circuit includes two output terminals connected respectively to the two actuating solenoids of the two fuel injection valves. When actuating one of the two injection valves, the grounding impedance between the output terminal connected to the actuating solenoid of the other of the two injection valves and the ground, is reduced.

5 Claims, 6 Drawing Sheets

PRIOR ART

FIG. 4

PRIOR ART

FUEL INJECTION APPARATUS FOR INTERNAL COMBUSTION ENGINE

BACKGROUND OF THE INVENTION

1. Field of the Invention

The present invention relates to a fuel injection apparatus having a fuel injection valve for injecting fuel into a combustion chamber of an internal combustion engine, and particularly to the fuel injection apparatus provided with an in-cylinder pressure sensor which is mounted on a tip portion of the fuel injection valve and detects a pressure in the combustion chamber.

2. Description of the Related Art

Japanese Patent Laid-open Publication No. 2014-1700 discloses a control apparatus for an internal combustion engine having a fuel injection valve for injecting fuel into a combustion chamber of the engine, and an in-cylinder pressure sensor which is mounted on a tip portion of the fuel injection valve and detects a pressure in the combustion chamber. According to this apparatus, reduction in accuracy of the control based on the output signal of the in-cylinder pressure sensor is prevented by reducing a fuel injection noise generated by performing the fuel injection. Specifically, a process for replacing the detected in-cylinder pressure during a noise removal period with an estimated motoring pressure calculated one combustion cycle before, or a process for replacing the detected in-cylinder pressure during the noise removal period with a detected in-cylinder pressure obtained in the fuel cut operation, is performed.

In the above-described conventional apparatus, the process which replaces the detected in-cylinder pressure with the estimated pressure or the detected in-cylinder pressure detected in the fuel cut operation is performed for removing the fuel injection noise. Accordingly, there exists a problem that the detection accuracy of the in-cylinder pressure falls in the period during which the fuel injection noise enters the detection signal. Further, if entering of the fuel injection noise occurs in the expansion stroke, it is impossible to perform the noise removal by the signal replacing process.

SUMMARY OF THE INVENTION

The present invention was made contemplating the above-described point, and an objective of the present invention is to provide a fuel injection apparatus for an internal combustion engine having a plurality of cylinders, provided with a fuel injection valve for injecting fuel into a combustion chamber corresponding to each cylinder, and an in-cylinder pressure sensor mounted on a tip portion of the fuel injection valve of each cylinder, wherein entering of the fuel injection noise to the detection signal of the in-cylinder pressure sensor can be suppressed without performing the signal replacing process.

To attain the above objective, the present invention provides a fuel injection apparatus for an internal combustion engine (1) having a plurality of cylinders. The fuel injection apparatus includes a fuel injection valve (7) and an in-cylinder pressure sensor (2) disposed for each of the plurality of cylinders. The fuel injection valve injects fuel into a combustion chamber of each cylinder and the in-cylinder pressure sensor detects a pressure in the combustion chamber. The fuel injection apparatus includes at least one cylinder pair actuating circuit and noise suppressing means (41). The at least one cylinder pair actuating circuit is provided corresponding to at least one cylinder pair which is a combination of two cylinders (e.g., #1-cylinder and #4-cylinder) included in the plurality of cylinders. The at least one cylinder pair actuating circuit supplies actuating current to two actuating solenoids (L1, L4) of the two fuel injection valves mounted on the at least one cylinder pair. The noise suppressing means is disposed between the at least one cylinder pair actuating circuit and the actuating solenoids. The noise suppressing means includes two output terminals (T12, T13) connected respectively to the two actuating solenoids of the two fuel injection valves, and grounding impedance reducing means (R13, Q13, etc.) for reducing a grounding impedance between one of the two output terminals and the ground. When actuating one (e.g., the fuel injection valve 7 of #4-cylinder) of the two injection valves, the grounding impedance reducing means reduces the grounding impedance between the output terminal (T12) connected to the actuating solenoid (L1) of the other (e.g., the fuel injection valve 7 of #1-cylinder) of the two injection valves and the ground.

With this configuration, the two fuel injection valves mounted on the cylinder pair is actuated by the cylinder pair actuating circuit, and when actuating one of the two fuel injection valves, the grounding impedance of the output terminal connected to the actuating solenoid of the other fuel injection valve (i.e., the impedance between the ground and the output terminal connected to the actuating solenoid of the other fuel injection valve) is reduced. This reduction in the grounding impedance makes it possible to suppress or prevent entering of the fuel injection noise to the detection signal of the in-cylinder pressure sensor mounted on the other fuel injection valve when actuating the one fuel injection valve.

Preferably, the noise suppressing means includes an input terminal (T11) connected to the at least one cylinder pair actuating circuit, and current limiting means (R13, Q11, Q12, etc.) provided between the input terminal and the two output terminals (T12, T13). When actuating one (e.g., the fuel injection valve 7 of #4-cylinder) of the two injection valves, the current limiting means limits the current from the input terminal (T11) to the output terminal (T12) connected to the actuating solenoid (L1) of the other (e.g., the fuel injection valve 7 of #1-cylinder) of the two fuel injection valves.

With this configuration, when actuating one of the two injection valves, the current from the input terminal to the output terminal connected to the actuating solenoid of the other fuel injection valve, is limited. Accordingly, excessive current can be prevented, even when the grounding impedance between the output terminal connected to the actuating solenoid of the other fuel injection valve, is reduced.

Preferably, when actuating one (e.g., the fuel injection valve 7 of #4-cylinder) of the two injection valves, the grounding impedance reducing means makes the grounding impedance of the output terminal (T12) connected to the actuating solenoid (L1) of the other (e.g., the fuel injection valve 7 of #1-cylinder) of the two injection valves, substantially equal to "0".

With this configuration, when actuating one of the two injection valves, the grounding impedance of the output terminal connected to the actuating solenoid of the other of the two injection valves, is made to be substantially equal to "0". Accordingly, the fuel injection noise can be prevented from entering the detection signal of the in-cylinder pressure sensor.

Preferably, the current limiting means consists of two insulated gate bipolar transistors (Q11) and a control block (S11, D11, R11, R12, R13, Q13, etc.) for performing on/off control of the two insulated gate bipolar transistors, the two insulated gate bipolar transistors being connected between the input terminal (T11) and the two output terminals (T12, T13) respectively. When actuating one (e.g., the fuel injection valve 7 of #4-cylinder) of the two fuel injection valves, the control block turns on the insulated gate bipolar transistor (Q11) connected between the input terminal (T11) and the output terminal (T13) connected to the one of the two fuel injection valves, and turns off the insulated gate bipolar transistor (Q11) connected between the input terminal (T11) and the output terminal (T12) connected to the other (e.g., the fuel injection valve 7 of #1-cylinder) of the two fuel injection valves.

With this configuration, the on/off control of the two insulated gate bipolar transistors connected between the input terminal and the two output terminals, is performed. When actuating one of the two fuel injection valves, the insulated gate bipolar transistor connected between the input terminal and the output terminal connected to the one of the two fuel injection valves, is turned on, and the insulated gate bipolar transistor connected between the input terminal and the output terminal connected to the other of the two fuel injection valves, is turned off. Accordingly, futile current can be prevented from flowing even when the grounding impedance between the ground and the output terminal connected to the actuating solenoid of the not-actuated fuel injection valve, is made to be substantially equal to "0".

DETAILED DESCRIPTION OF THE PREFERRED EMBODIMENTS

Preferred embodiments of the present invention will now be described with reference to the drawings.

Figure 1:
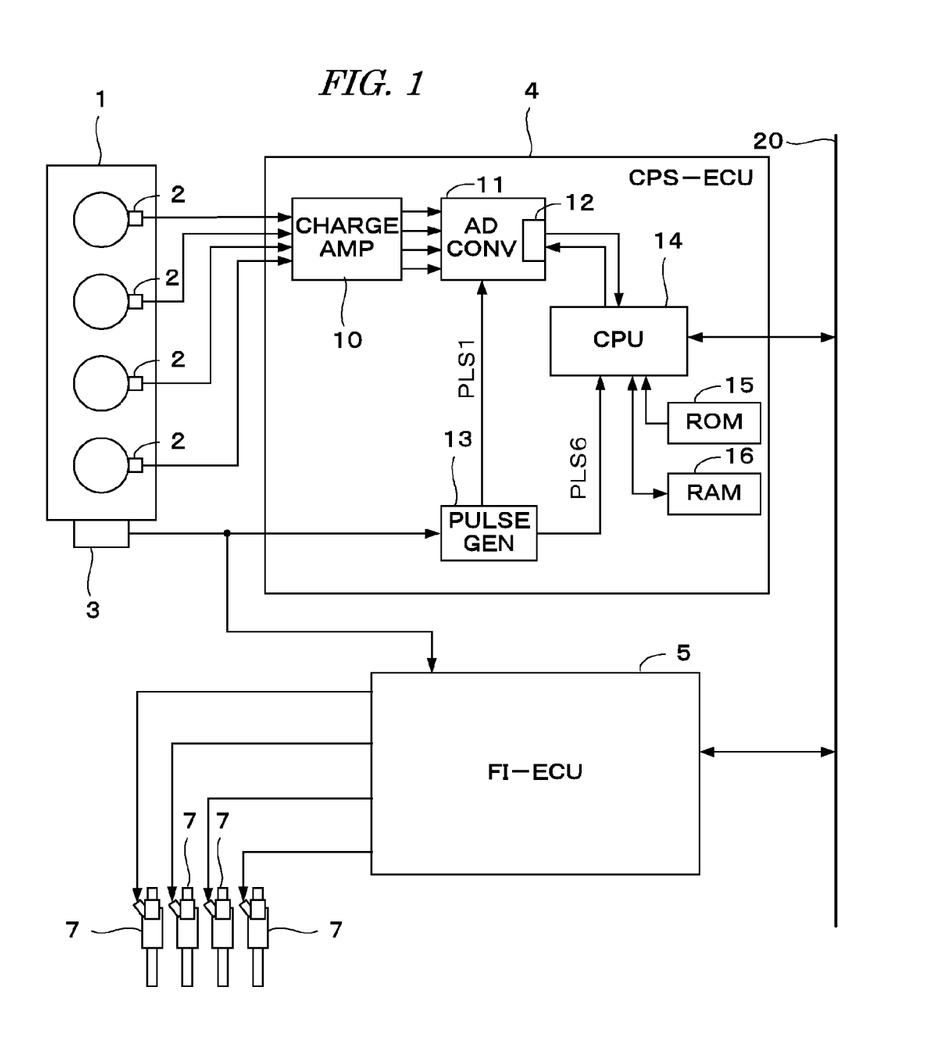
FIG. 1 shows a configuration of a control apparatus for an internal combustion engine according to one embodiment of the present invention.
Figure 2:
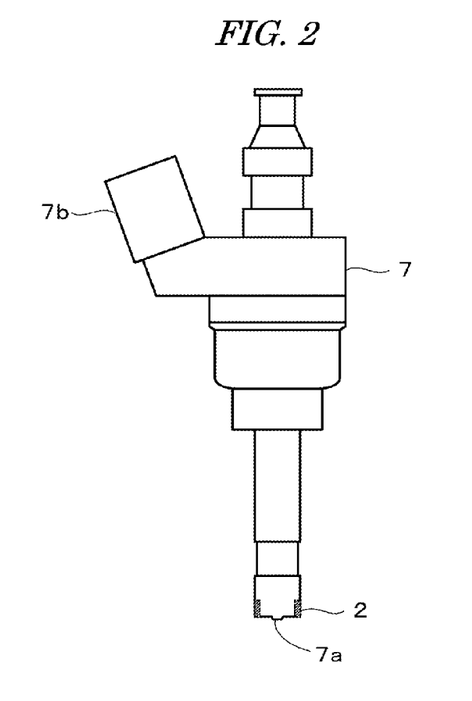
FIG. 2 is a drawing for illustrating a location of an in-cylinder pressure sensor.

FIG. 1 shows a configuration of a control apparatus for an internal combustion engine according to one embodiment of the present invention. Each cylinder of a 4-cylinder direct injection internal combustion engine (hereinafter referred to as "engine") 1 is provided with an in-cylinder pressure sensor 2 for detecting an in-cylinder pressure PCYL. In this embodiment, the in-cylinder pressure sensor 2 is integrated with a fuel injection valve 7 mounted on each cylinder as shown in FIG. 2. It is to be noted that the in-cylinder pressure sensor 2 and the fuel injection valve 7 are separately shown in FIG. 1, since FIG. 1 is a drawing for explaining the configuration of the control apparatus.

The in-cylinder pressure sensor 2 consists of a piezo-electric element having a ring-like shape, and is disposed at a position so that the piezo-electric element surrounds an injection orifice 7a of the fuel injection valve 7. Connection lines for outputting a detection signal of the in-cylinder pressure sensor 2 and connection lines for supplying an actuating signal to the fuel injection valve 7 are connected via a connection block 7b to an in-cylinder pressure sensing unit (hereinafter referred to as "CPS-ECU") 4, and an electronic control unit (hereinafter referred to as "FI-ECU") 5 for controlling the engine 1. A fuel injection valve actuating signal (a valve opening command signal) is supplied to the fuel injection valve 7 from the FI-ECU 5. The fuel injection valve 7 is opened according to the actuating signal output from the FI-ECU 5, and the fuel of an amount corresponding to a valve opening period of the fuel injection valve 7 is injected into a combustion chamber of each cylinder.

The engine 1 is provided with a crank angle position sensor 3 for detecting a rotation angle of a crankshaft (not shown) of the engine 1. The crank angle position sensor 3 generates a pulse signal of 1-degree crank angle period, a pulse signal of 180-degree crank angle period, and a pulse signal of 720-degree crank angle period, and supplies the generated pulse signals to the CPS-ECU 4 and the FI-ECU 5.

The CPS-ECU4 is provided with a charge amplifier block 10, an A/D conversion block 11, a pulse generation block 13, a CPU (Central Processing Unit) 14, a ROM (Read Only Memory) 15 for storing programs executed by the CPU 14, and a RAM (Random Access Memory) 16 in which the CPU stores data of the detected in-cylinder pressure and calculation results and the like. The detection signal of the in-cylinder pressure sensor 2 is input to the charge amplifier block 10. The charge amplifier block 10 integrates and amplifies the input signal. The signal integrated and amplified by the charge amplifier block 10 is input to the A/D conversion block 11. The pulse signals output from the crank angle position sensor 3 are input to the pulse generation block 13. The charge amplifier block 10 consists of an operational amplifier, capacitors, resistors, and other parts. In the present specification, the output signal of the charge amplifier block 10 is described as an in-cylinder pressure sensor detection signal PCYL.

The A/D conversion block 11 having a buffer 12 converts the in-cylinder pressure detection signal input from the charge amplifier block 10 to a digital value, and stores the digital value in the buffer 12. Specifically, the A/D conversion block 11 is supplied with the pulse signal (hereinafter referred to as "1-degree pulse") PLS1 of 1-degree crank angle period from the pulse generation block 13. The A/D conversion block 11 performs sampling of the in-cylinder pressure detection signal with the period of the 1-degree pulse PLS1, converts the sampled signal value to a digital value, and stores the digital value in the buffer 12.

On the other hand, the CPU 14 is supplied with a pulse signal PLS6 of a 6-degree crank angle period from the pulse generation block 13, and the CPU 14 performs a process for reading the digital value stored in the buffer 12 with the period of the 6-degree pulse PLS6.

The FI-ECU5 is provided with an input circuit including an A/D conversion circuit, a CPU, a ROM, a RAM, and an output circuit (including a fuel injection valve actuating circuit described later). The FI-ECU calculates an opening time period and an opening timing of the fuel injection valve 7, and an ignition timing of an ignition plug (not shown), according to an engine rotational speed NE calculated based on the pulse signal supplied from the crank angle position sensor 3 and other engine operating parameters, such as an intake air flow rate GAIR of the engine 1, an intake pressure PBA, a cooling water temperature TW, and an intake air temperature TA, which are detected by sensors not shown, to control the fuel supply amount and the ignition timing of the engine 1.

The CPS-ECU4 and the FI-ECU5 are connected with each other via a data bus 20, and mutually transmit and receive required data through the data bus 20.

Figure 3:
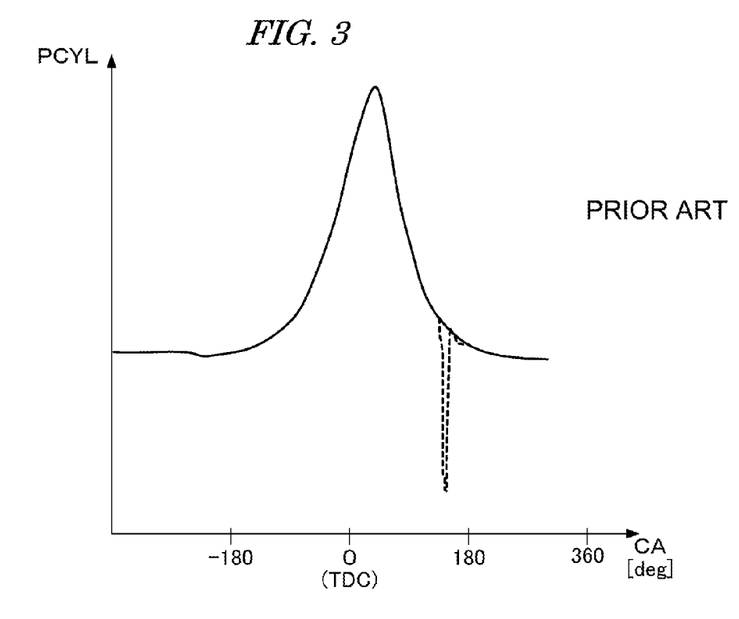
FIG. 3 is a time chart for explaining a problem solved by the present invention.

FIG. 3 is a time chart (the horizontal axis indicates a crank angle CA) for specifically explaining the problem to be solved by the present invention, and shows changes in the in-cylinder pressure sensor detection signal PCYL. When using the in-cylinder pressure sensor 2 integrated with the fuel injection valve 7 as shown in FIG. 2, a noise (fuel injection noise) due to the valve opening actuating signal of the fuel injection valve 7 enters the in-cylinder pressure sensor detection signal PCYL, and the detection signal waveform greatly changes as shown by the broken line.

The fuel injection noise appears when employing the configuration in which one common actuating circuit is provided for two fuel injection valves 7. Specifically, it is confirmed that the fuel injection noise which enters the detection signal of the in-cylinder pressure sensor 2 mounted on one of the two fuel injection valves, is generated by the fuel injection of the other of the two fuel injection valves, and the noise enters the detection signal through the common actuating circuit (hereinafter referred to as "cylinder pair actuating circuit"). In this embodiment, a noise removal circuit is inserted between the cylinder pair actuating circuit and the fuel injection valves, which prevents the fuel injection noise indicated by the broken line in FIG. 3 from entering the detection signal, thereby making it possible to obtain the detection signal waveform shown by the solid line.

Figure 4:
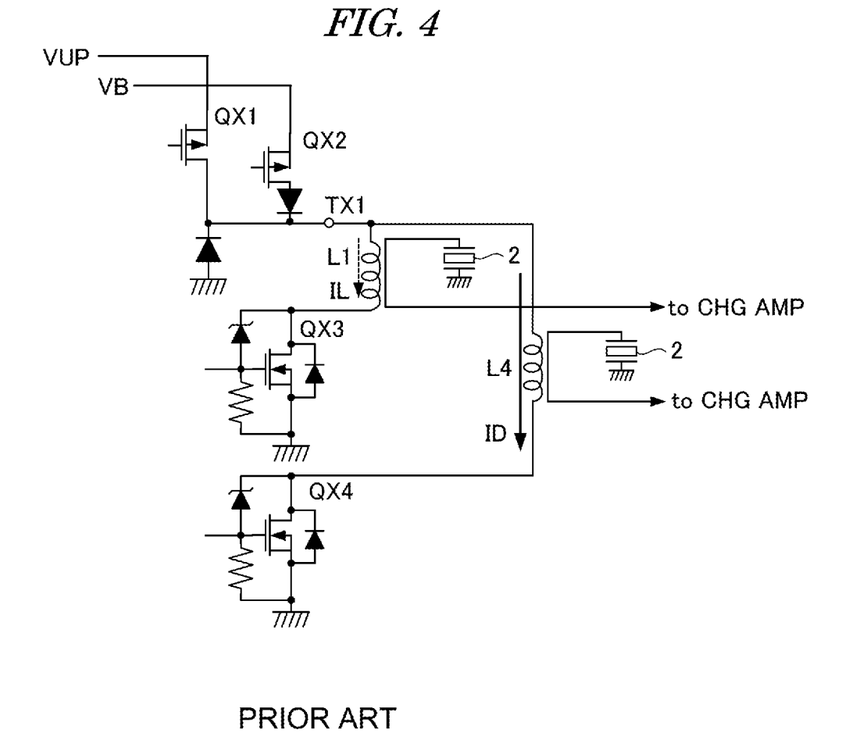
FIG. 4 is a circuit diagram for explaining a reason for entering of the fuel injection noise shown by the broken line in FIG. 3 to a detection signal of the in-cylinder pressure.

FIG. 4 shows a configuration of a conventional circuit for actuating the fuel injection valves 7 of #1-cylinder and #4-cylinder in order to explain the reason why the fuel injection noise indicated by the broken line in FIG. 3 enters the detection signal. The actuating solenoids L1 and L4 of the fuel injection valves 7 of #1-cylinder and #4-cylinder are connected to the terminal TX1. FIG. 4 further shows the in-cylinder pressure sensors 2 integrated with the fuel injection valves 7, and connecting lines (directed to the charge amplifier block 10). QX1 shown in FIG. 4 is a transistor for controlling supply of the boosted voltage VUP, and QX2 shown in FIG. 4 is a transistor for controlling supply of the battery voltage VB. By turning on the transistor QX3, the actuating current is supplied to the actuating solenoid L1 of #1-cylinder, and by turning on the transistor QX4, the actuating current is supplied to the actuating solenoid L4 of #4-cylinder.

In this conventional circuit, the actuating current ID flows through the actuating solenoid L4 when turning on the transistor QX4 to open the fuel injection valve 7 of #4-cylinder. At this time, a slight leak current IL flows through the actuating solenoid L1 connected to the terminal TX1. It is considered that the leak current IL causes the entering of the fuel injection noise to the detection signal of the in-cylinder pressure 2. Accordingly, in this embodiment, a noise removal circuit is inserted, as described below, between the terminal TX1 and the actuating solenoids L1 and L4, to prevent the entering of the fuel injection noise to the detection signal.

Figure 5:
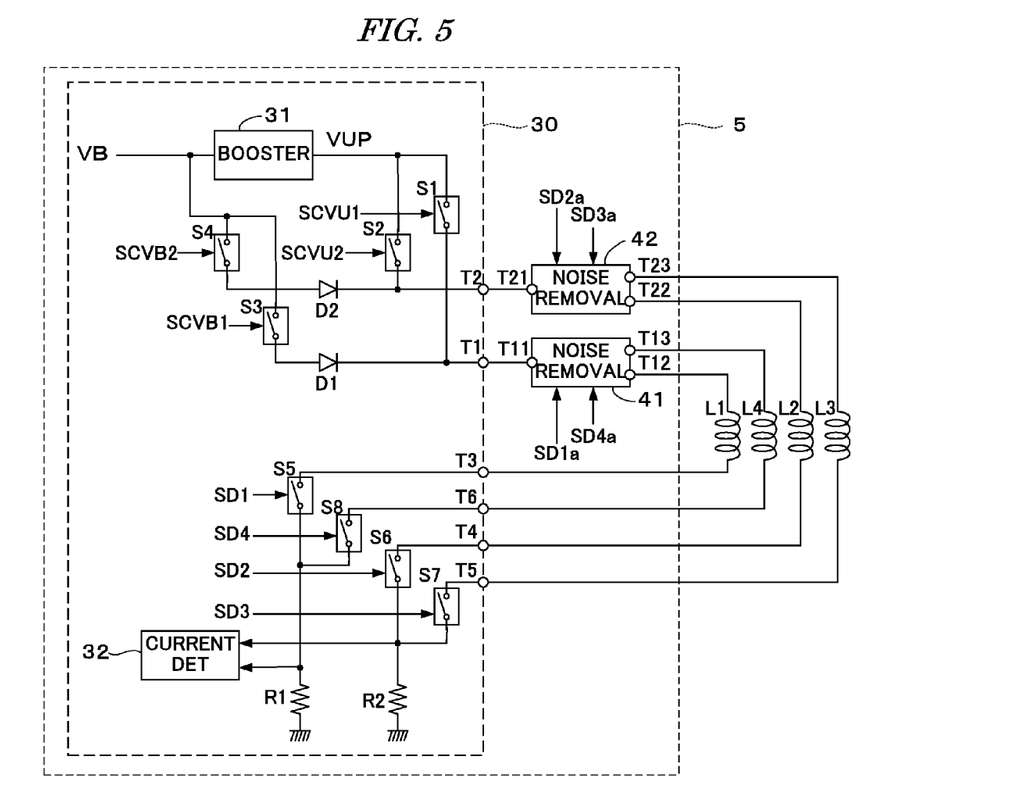
FIG. 5 shows a connection between a main portion of a fuel injection valve actuating block, noise removal circuits, and solenoids of fuel injection valves.

FIG. 5 shows a connection between a main portion of a fuel injection valve actuating block 30 included in the FI-ECU5, the noise removal circuits, and the actuating solenoids of the fuel injection valves 7. In FIG. 5, actuating solenoids L1-L4 provided respectively in #1-cylinder to #4-cylinder are shown.

The fuel injection valve actuating block 30 is provided with switching elements S1-S8, diodes D1 and D2, resistors R1 and R2, a booster circuit 31, a current detecting block 32, and a control CPU (not shown). The fuel injection valve actuating block 30 is connected to the noise removal circuits 41 and 42 via terminals T1 and T2, and further connected to the actuating solenoids L1-L4 via terminals T3-T6. For example, field effect transistors are used as the switching elements S1-S8. The fuel injection valve actuating block 30 constitutes two cylinder pair actuating circuits.

The booster circuit 31 boosts the battery voltage VB to output the boosted voltage VUP. The boosted voltage VUP is output to the terminals T1 and T2 via the switching elements S1 and S2. The battery voltage VB is output to the terminals T1 and T2 via the switching elements S3, S4 and the diodes D1, D2. The switching elements S5 and S8 connected respectively to the terminals T3 and T6 are connected to one end of the resistor R1, and the other end of the resistor R1 is grounded. Similarly the switching elements S6 and S7 connected respectively to the terminals T4 and T5 are connected to one end of the resistor R2, and the other end of the resistor R2 is grounded.

The one ends of the resistor R1 and R2 are connected to the current detecting block 32, and values of the currents flowing through the actuating solenoids L1-L4 are detected with the voltage between both ends of the resistor R1 and R2 when actuating the fuel injection valves.

Figures 6A, 6B:
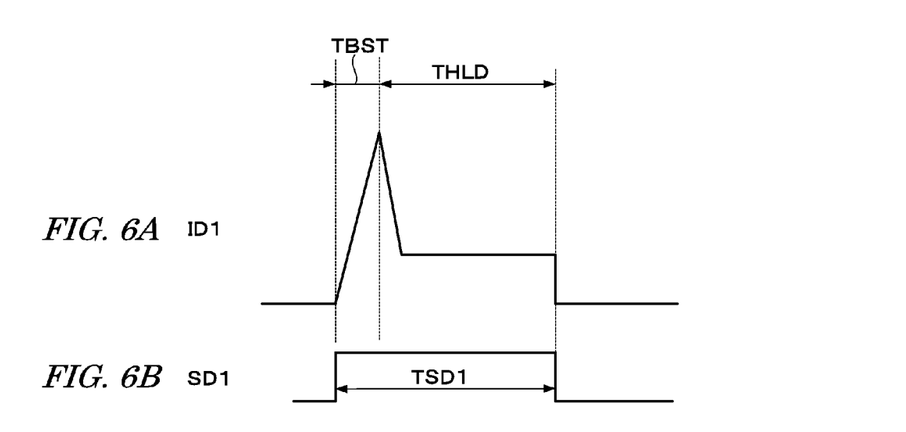
FIGS. 6A and 6B are time charts showing changes in the current flowing through the actuating solenoid of the fuel injection valve and the corresponding valve opening command signal.

FIG. 6A is a time chart which schematically shows changes in the current ID1 flowing through the actuating solenoid L1, and FIG. 6B shows the corresponding valve opening command signal SD1. It is to be noted that the currents ID2-ID4 flowing through the actuating solenoids L2-L4, and the valve opening command signals SD2-SD4 change similarly.

The on/off control of the switching element S5 is performed by the valve opening command signal SD1 so that the switching element S5 is turned on during the period TSD1 during which the valve opening command signal SD1 becomes a high level. The on/off control of the switching elements S6-S8 is similarly performed by the valve opening command signals SD2-SD4 when opening the corresponding fuel injection valves. The valve opening command signals SD1-SD4 are supplied from the control CPU.

Further, the switching element S1 is controlled by the boosted voltage control signal SCVU1 so as to turn on during the boost period TBST shown in FIG. 6A, and the on/off control of the switching element S3 is performed so that the valve opening state of the fuel injection valve 7 is maintained by the battery voltage control signal SCVB1 during the holding period THLD shown in FIG. 6A. The switching elements S2 and S4 are similarly controlled by the boost voltage control signal SCVU2 and the battery voltage control signal SCVB2, respectively. The control signals SCVU1, SCVU2, SCVB1, and SCVB2 are supplied from the control CPU.

The terminals T1 and T2 of the fuel injection valve actuating block 30 are respectively connected to the input terminals T11 and T21 of the noise removal circuits 41 and 42. The output terminals T12 and T13 of the noise removal circuit 41 are respectively connected to the actuating solenoids L1 and L4, and the output terminals T22 and T23 of the noise removal circuit 42 are respectively connected to the actuating solenoids L2 and L3. Switching control signals SD1a and SD4a are supplied to the noise removal circuit 41 from the control CPU, and switching control signals SD2a and SD3a are supplied to the noise removal circuit 42 from the control CPU.

Figure 7:
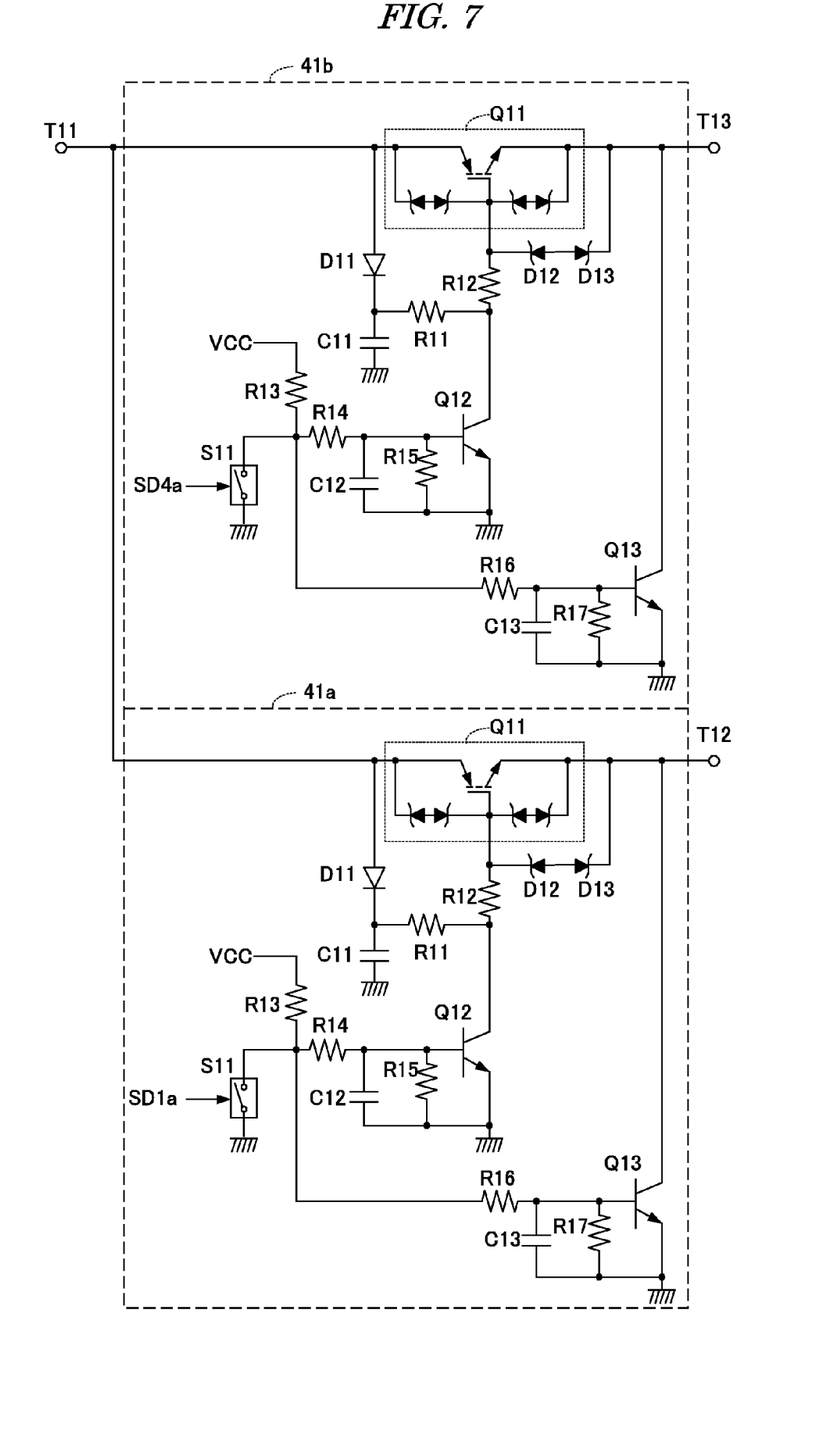
FIG. 7 is a circuit diagram showing a configuration of the noise removal circuit shown in FIG. 5.

FIG. 7 is a circuit diagram showing a configuration of the noise removal circuit 41. The noise removal circuit 41 consists of a first circuit block 41a and a second circuit block 41b, and two circuit blocks 41a and 41b substantially have the same configuration. That is, the first and second circuit blocks 41a and 41b are respectively provided with an insulated gate bipolar transistor (hereinafter referred to as "IGBT") Q11, transistors Q12 and Q13, diodes D11-D13, resistors R11-R17, capacitors C11-C13, and a switching element S11. The switching control signal SD1a is supplied to the switching element S11 of the first circuit block 41a, and the switching control signal SD4a is supplied to the switching element S11 of the second circuit block 41b.

Figure 8A:
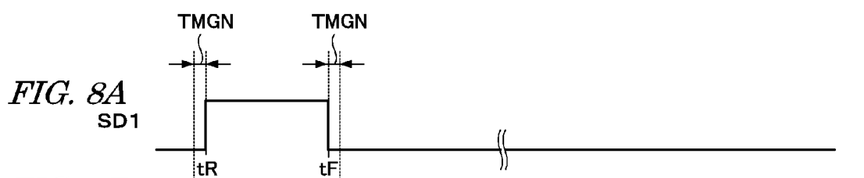
FIG. 8A-8D are time charts for illustrating switching control signals (SD1a, SD4a) of the switching element (S11) shown in FIG. 7.
Figure 8B:
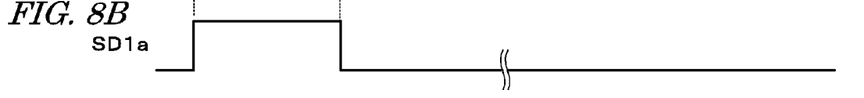
Figure 8C:
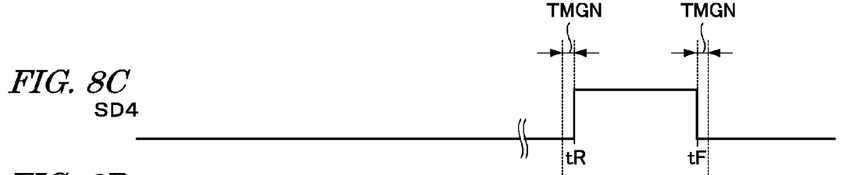
Figure 8D:
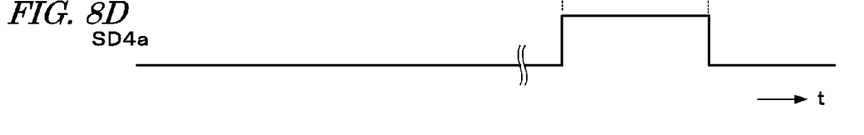

The switching control signal SD1a is obtained as shown in FIGS. 8A and 8B, by advancing the rise timing tR of the valve opening command signal SD1 by the margin time period TMGN, and retarding the fall timing tF of the valve opening command signal SD1 by the margin time period TMGN, the valve opening command signal SD1 corresponding to the fuel injection valve of #1-cylinder. Similarly, the switching control signal SD4a is obtained as shown in FIGS. 8C and 8D, by advancing the rise timing tR of the valve opening command signal SD4 by the margin time period TMGN, and retarding the fall timing tF of the valve opening command signal SD4 by the margin time period TMGN, the valve opening command signal SD4 corresponding to the fuel injection valve of #4-cylinder. The switching element S11 is turned on when the switching control signal SD1a and SD4a become a high level.

When the switching element S11 is turned off, the power supply voltage VCC is applied to the base of the transistor Q12 through the resistors R13 and R14, and the power supply voltage VCC is also applied to the base of the transistor Q13 through the resistors R13 and R16, by which both of the two transistors Q12 and Q13 are turned on. Accordingly, the voltage at the connecting point of the resistors R11 and R12 substantially becomes "0", and the IGBTQ11 is turned off. In the first circuit block 41a, the impedance between the output terminal T12 and the ground (the grounding impedance of the output terminal T12) substantially becomes "0", and the grounding impedance of the output terminal T13 substantially becomes "0" in the second circuit block 41b.

Accordingly, when performing the fuel injection in #4-cylinder, the leak current IL shown in FIG. 4 is bypassed with the first circuit block 41a, and the leak current IL is prevented from flowing through the actuating solenoid L1. On the other hand, when performing the fuel injection in #1-cylinder, the leak current IL is prevented from flowing through the actuating solenoid L4. Consequently, it is possible to prevent the fuel injection noise of one of the two cylinders constituting the cylinder pair from entering the in-cylinder pressure detection signal of the other of the two cylinders.

When the switching element S11 is turned on, the power supply voltage VCC is no longer applied to the base of the transistors Q12 and Q13, by which both of the two transistors Q12 and Q13 are turned off. Accordingly, the IGBTQ11 is turned on and the state where the grounding impedance of the output terminals T12 and T13 is substantially equal to "0" is canceled, which makes it possible to supply the actuating currents respectively to the actuating solenoids L1 and L4.

Accordingly, when performing valve opening operation of the fuel injection valve 7 of #1-cylinder, the transistors Q12 and Q13 in the first circuit block 41a are turned off, by which the actuating current ID is supplied to the actuating solenoid L1. On the other hand, the transistors Q12 and Q13 in the second circuit block 41b are turned on, by which the IGBTQ11 is turned off and the grounding impedance of the output terminal T13 substantially becomes "0". Consequently, it is possible to eliminate influence of the fuel injection noise due to actuating the fuel injection valve 7 of #1-cylinder, thereby preventing the fuel injection noise from entering the detection signal of the in-cylinder pressure sensor 2 mounted on the fuel injection valve of #4-cylinder.

Further, when performing valve opening operation of the fuel injection valve 7 of #4-cylinder, the transistors Q12 and Q13 in the second circuit block 41b are turned off, by which the actuating current ID is supplied to the actuating solenoid L4. On the other hand, the transistors Q12 and Q13 in the first circuit block 41a are turned on, which makes it possible to eliminate influence of the fuel injection noise due to actuating the fuel injection valve 7 of #4-cylinder, thereby preventing the fuel injection noise from entering the detection signal of the in-cylinder pressure sensor 2 mounted on the fuel injection valve 7 of #1-cylinder.

Further, the noise removal circuit 42 is configured similarly to the noise removal circuit 41. It is therefore possible, with respect to the cylinder pair of #2-cylinder and #3-cylinder, to prevent the fuel injection noise generated by one cylinder from entering the detection signal of the in-cylinder pressure sensor 2 mounted on the other cylinder.

As described above, in this embodiment, the two fuel injection valves 7 mounted on each cylinder pair (the cylinder pair of #1-cylinder and #4-cylinder; and the cylinder pair of #2-cylinder and #3-cylinder) are actuated by the cylinder pair actuating circuit included in the fuel injection valve actuating block 30. The noise removal circuit 41 has the output terminals T12 and T13 respectively connected to the actuating solenoids L1 and L4. When actuating one of the two fuel injection valves 7 (e.g., the fuel injection valve of #4-cylinder), the transistor Q13, connected between the output terminal T12 and the ground, is turned on, which makes the grounding impedance of the output terminal T12 substantially equal to "0", the output terminal T12 being connected to the actuating solenoid L1 of the other of the two fuel injection valves 7 (e.g., the fuel injection valve of #1-cylinder). Accordingly, it is possible to prevent the fuel injection noise from entering the detection signal of the in-cylinder pressure sensor 2 mounted on the fuel injection valve 7 of #1-cylinder, when actuating the fuel injection valve 7 of #4-cylinder.

Further, when actuating one of the two fuel injection valves 7 corresponding to the above-described cylinder pair (e.g., the fuel injection valve of #4-cylinder), the IGBTQ11 connected between the input terminal T11 and the output terminal T12 is turned off, which makes it possible to prevent excessive current from flowing even when the grounding impedance of the output terminal T12 is made to be substantially equal to "0".

In this embodiment, the cylinder pair actuating circuit corresponding to the cylinder pair of #1-cylinder and #4-cylinder is configured by the switching elements S1, S3, S5, and S8, the diode D1, and the resistor R1. The cylinder pair actuating circuit corresponding to the cylinder pair of #2-cylinder and #3-cylinder is configured by the switching elements S2, S4, S6, and S7, the diode D2, and the resistor R2. The noise removal circuits 41 and 42 and the control CPU in the fuel injection valve actuating block 30 which supplies the switching control signal SD1a-SD4a for the switching element S11, correspond to the noise suppressing means. The switching element S11, the resistors R13, R16, R17, the capacitor C13, the transistor Q13, and the control CPU correspond to the grounding impedance reducing means. The IGBTQ11, the diode D11, the capacitor C11, the resistors R11, R12, the switching element S11, the resistors R13, R14, R15, the capacitor C12, the transistor Q12, and the control CPU correspond to the current limiting means. The switching element S11, the resistors R13, R14, R15, the capacitor C12, the transistor Q12, and the control CPU correspond to the control block.

The present invention is not limited to the embodiment described above, and various modifications may be made. For example, in the noise removal circuits 41 and 42 described above, the collector of the transistor Q13 and the terminals T12, T13, T22, T23 are directly connected. Accordingly, when the transistor Q13 is turned on, the grounding impedance of the terminals T12, T13, T22, and T23 substantially becomes "0". Alternatively, a resistor of very small resistance (e.g., about 1 ohm) may be inserted between the collector of the transistor Q13 and the terminals T12, T13, T22, T23. In this modification, the reducing effect of the fuel injection noise can be obtained although the effect becomes less than the reducing effect in the above-described embodiment.

Further, a resistor of very large resistance (e.g., about 1 Mega ohms) may be connected in parallel with the IGBTQ11 in the noise removal circuits 41 and 42. In such modification, the current limiting is performed by the resistor connected in parallel when the IGBTQ11 is turned off.

In the embodiment described above, an example in which the present invention is applied to the fuel injection apparatus for a 4-cylinder internal combustion engine. The present invention is applicable to the fuel injection apparatus for an internal combustion engine provided with two or more cylinders, not limited to four cylinders. Specifically, when adopting the configuration where the actuating current for the actuating solenoids of two fuel injection valves mounted on two cylinders constituting a cylinder pair is supplied from one cylinder pair actuating circuit, the present invention makes it possible, when actuating one of the two fuel injection valves, to suppress or prevent entering of the fuel injection noise to the detection signal of the in-cylinder pressure sensor mounted on the other of the two fuel injection valves. Further, if the number of cylinders is an odd number, one actuating circuit is provided for one cylinder which does not constitute the cylinder pair.

What is claimed is:

1. A fuel injection apparatus for an internal combustion engine having a plurality of cylinders, including a fuel injection valve and an in-cylinder pressure sensor disposed in each of the plurality of cylinders, the fuel injection valve injecting fuel into a combustion chamber of each cylinder and the in-cylinder pressure sensor detecting a pressure in the combustion chamber, the fuel injection apparatus comprising:

at least one cylinder pair actuating circuit provided corresponding to at least one cylinder pair which is a combination of two cylinders included in the plurality of cylinders, for supplying actuating current to two actuating solenoids of the two fuel injection valves mounted on the at least one cylinder pair; and noise suppressing means disposed between the at least one cylinder pair actuating circuit and the actuating solenoids, wherein the noise suppressing means includes two output terminals connected respectively to the two actuating solenoids of the two fuel injection valves, and grounding impedance reducing means for reducing a grounding impedance between one of the two output terminals and the ground, wherein when actuating one of the two injection valves, the grounding impedance reducing means reduces the grounding impedance between the output terminal connected to the actuating solenoid of the other of the two injection valves and the ground.

2. The fuel injection apparatus according to claim 1, wherein the noise suppressing means includes an input terminal connected to the at least one cylinder pair actuating circuit, and current limiting means provided between the input terminal and the two output terminals, wherein when actuating one of the two injection valves, the current limiting means limits the current from the input terminal to the output terminal connected to the actuating solenoid of the other of the two fuel injection valves.

3. The fuel injection apparatus according to claim 1, wherein when actuating one of the two injection valves, the grounding impedance reducing means makes the grounding impedance of the output terminal connected to the actuating solenoid of the other of the two injection valves, substantially equal to "0".

4. The fuel injection apparatus according to claim 2, wherein when actuating one of the two injection valves, the grounding impedance reducing means makes the grounding impedance of the output terminal connected to the actuating solenoid of the other of the two injection valves, substantially equal to "0".

5. The fuel injection apparatus according to claim 2, wherein the current limiting means consists of two insulated gate bipolar transistors and a control block for performing on/off control of the two insulated gate bipolar transistors, the two insulated gate bipolar transistors being connected between the input terminal and the two output terminals respectively, wherein when actuating one of the two fuel injection valves, the control block turns on the insulated gate bipolar transistor connected between the input terminal and the output terminal connected to the one of the two fuel injection valves, and turns off the insulated gate bipolar transistor connected between the input terminal and the output terminal connected to the other of the two fuel injection valves.

* * * * *